United States Patent
Yamasaki et al.

(10) Patent No.: US 9,819,414 B2
(45) Date of Patent: Nov. 14, 2017

(54) LIGHTING DEVICE AND VISIBLE LIGHT COMMUNICATION SYSTEM

(71) Applicant: Panasonic Intellectual Property Management Co., Ltd., Osaka (JP)

(72) Inventors: Shigeaki Yamasaki, Osaka (JP); Yosuke Kondo, Osaka (JP); Takashi Osugi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 80 days.

(21) Appl. No.: 14/967,775

(22) Filed: Dec. 14, 2015

(65) Prior Publication Data

US 2016/0191157 A1 Jun. 30, 2016

(30) Foreign Application Priority Data

Dec. 26, 2014 (JP) ................. 2014-266516

(51) Int. Cl.
*H04B 10/116* (2013.01)

(52) U.S. Cl.
CPC ................. *H04B 10/116* (2013.01)

(58) Field of Classification Search
CPC ................................. H04B 10/116
See application file for complete search history.

(56) References Cited

U.S. PATENT DOCUMENTS

| 9,294,666 B2* | 3/2016 | Oshima | H04N 5/23203 |
| 2003/0118343 A1* | 6/2003 | Ohe | H04B 10/40 |
| | | | 398/139 |
| 2013/0272716 A1* | 10/2013 | Lopez | H04B 10/1141 |
| | | | 398/127 |
| 2013/0330088 A1* | 12/2013 | Oshima | H04B 10/11 |
| | | | 398/130 |
| 2015/0188631 A1* | 7/2015 | Harbers | H05B 33/0803 |
| | | | 398/119 |

FOREIGN PATENT DOCUMENTS

| JP | 2007-034741 A | 2/2007 |
| JP | 2008-022299 A | 1/2008 |
| JP | 2008-085555 A | 4/2008 |
| JP | 2008-281561 A | 11/2008 |
| JP | 2011-061305 A | 3/2011 |
| JP | 2011-154581 A | 8/2011 |
| JP | 2014-038387 A | 2/2014 |

* cited by examiner

*Primary Examiner* — Nathan Curs
(74) *Attorney, Agent, or Firm* — Renner Otto Boisselle & Sklar, LLP

(57) ABSTRACT

A lighting device includes: a first light source which emits light that includes a visible light communication signal indicating first information; and a second light source which is disposed at a position different from a position of the first light source, and emits light that includes a visible light communication signal indicating second information different from the first information.

7 Claims, 17 Drawing Sheets

… (1) …

LIGHTING DEVICE AND VISIBLE LIGHT COMMUNICATION SYSTEM

CROSS REFERENCE TO RELATED APPLICATION

This application claims the benefit of priority of Japanese Patent Application Number 2014-266516 filed on Dec. 26, 2014, the entire content of which is hereby incorporated by reference.

BACKGROUND OF THE INVENTION

1. Field of the Invention

The present disclosure relates to lighting devices and visible light communication systems.

2. Description of the Related Art

Some visible light communication systems transmit information by turning on and off lighting devices. In such visible light communication systems, a lighting device emits light which includes, for example, an identifier for identifying the lighting device and/or positional information indicating a position where the lighting device is disposed. A terminal which has received the emitted light obtains positional information regarding the position of the terminal, based on the identifier and/or the positional information included in the received light.

A system has been disclosed which provides visitors at, for instance, an exhibition space with appropriate information using ng a visible light communication system (for example, Japanese Unexamined Patent Application Publication No. 2011-154581).

SUMMARY OF THE INVENTION

The light emitted by a lighting device, however, spreads out widely. Thus, the positional information obtained by a terminal is not sufficiently accurate.

The present disclosure provides a lighting device which improves the accuracy of positional information that a terminal obtains.

In order to address the above problem, a lighting device according to an aspect of the present disclosure includes a first light source which emits light that includes a visible light communication signal indicating first information; and a second light source which is disposed at a position different from a position of the first light source, and emits light that includes a visible light communication signal indicating second information different from the first information.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

The following describes in detail a lighting control system according to different embodiments with reference to the drawings. The embodiments described below each show a particular example. The numerical values, shapes, materials, constituent elements, the arrangement and connection of the constituent; elements, and others indicated in the following exemplary embodiments are mere examples, and therefore do not intend to limit the inventive concept. Thus, among the constituent elements in the following embodiments, constituent elements not recited in any of the independent claims defining the most generic part of the inventive concept are described as arbitrary constituent elements.

The drawings are schematic diagrams, and do not necessarily provide strictly accurate illustration. The same numeral is given to the same constituting member throughout the drawings.

Embodiment 1

The present embodiment describes a lighting device and a visible light communication system which improve the accuracy of positional information that a terminal obtains.

Figure 1:
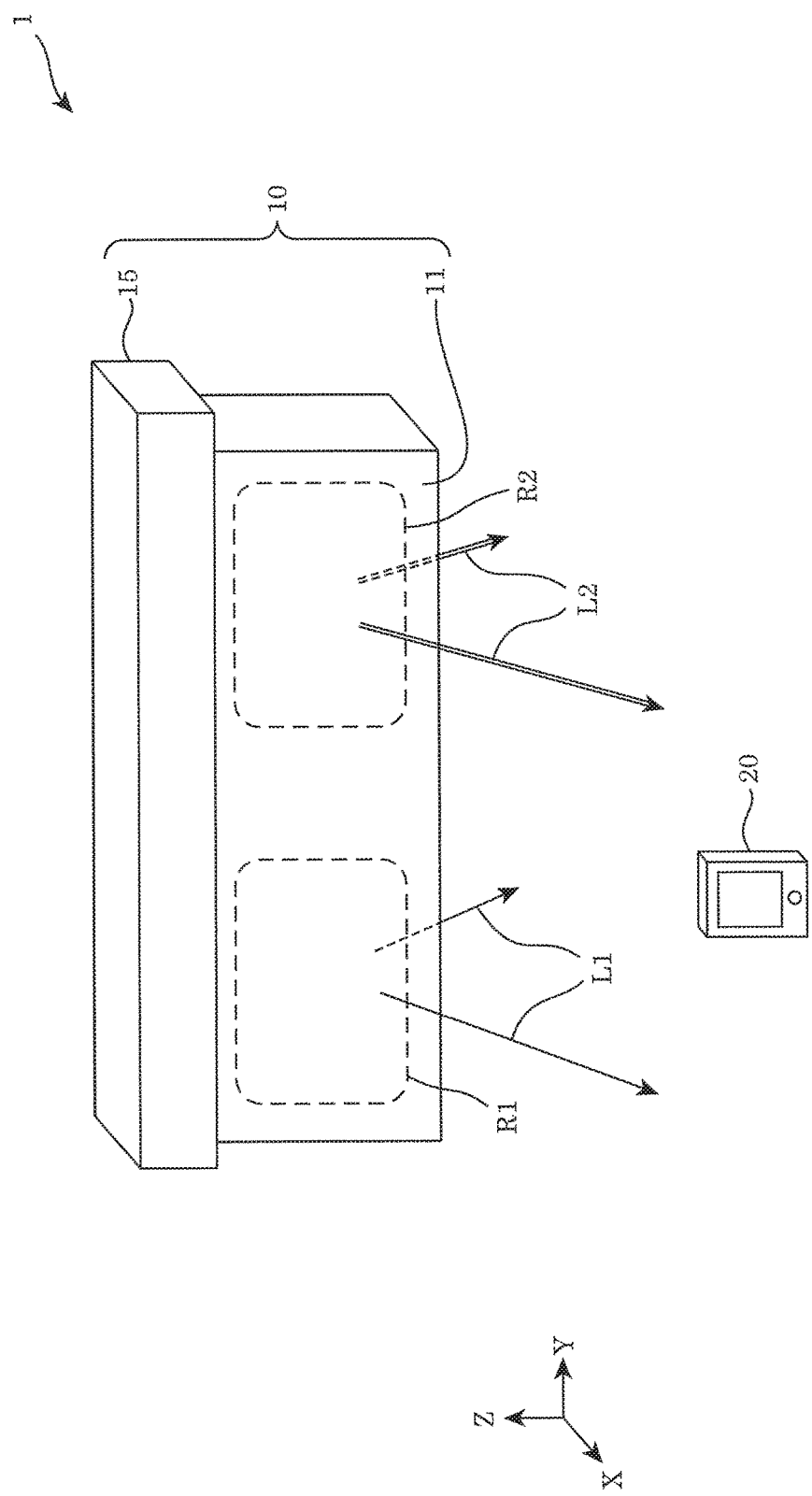
FIG. 1 is a schematic view of a visible light communication system according to Embodiment 1.
Figure 2:
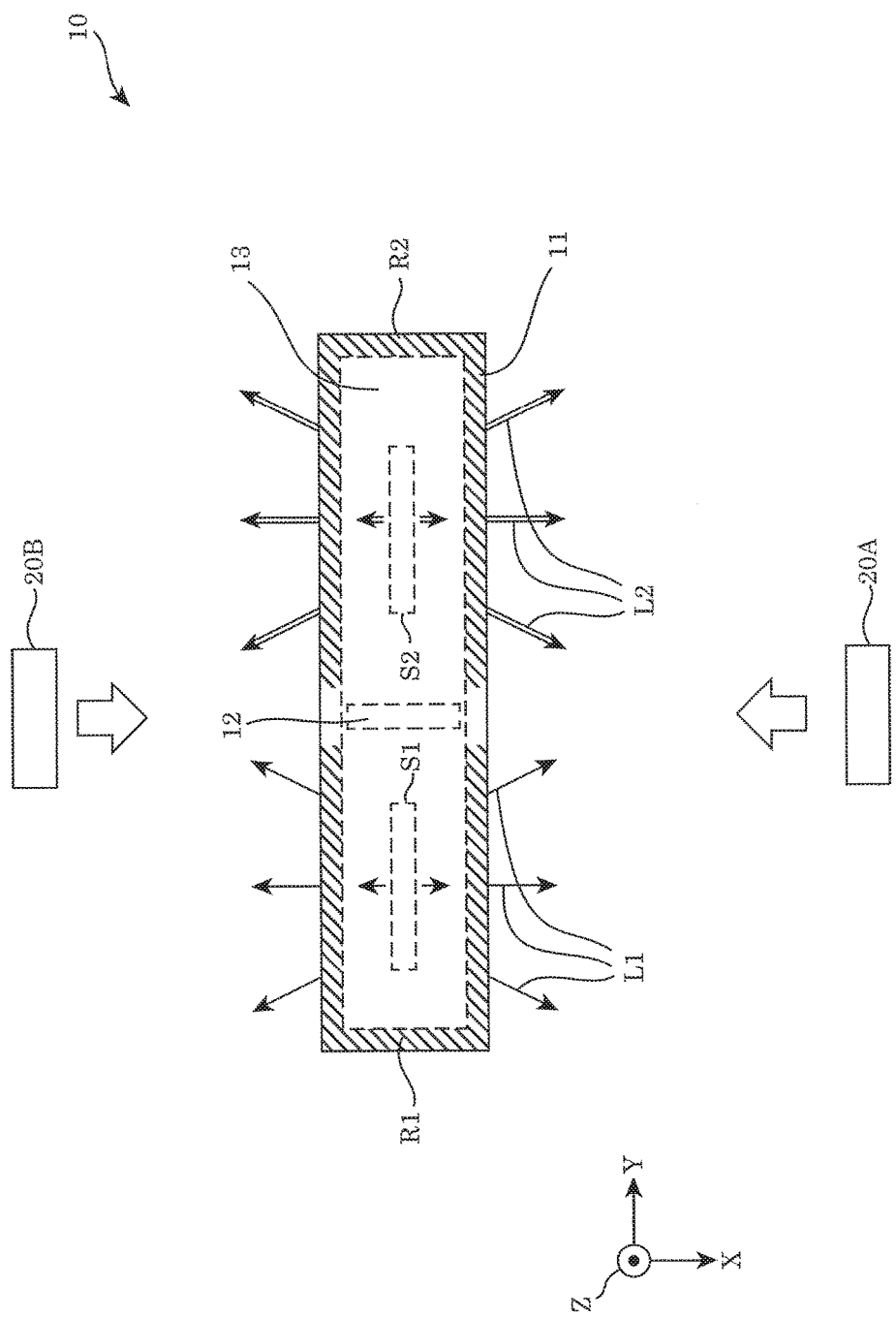
FIG. 2 is a schematic diagram illustrating a structure of a lighting device according to Embodiment 1.

FIG. 1 is a schematic view of visible light communication system 1 according to the present embodiment. FIG. 2 is a schematic diagram illustrating a structure of lighting device 10 according to the present embodiment. FIG. 2 illustrates the internal structure of lighting device 10 in top view.

Note that the following may give a description using X, Y, and Z coordinate axes. The positive direction and the negative direction of the Z axis may be referred to as upward and downward, respectively, and the positive direction and the negative direction of the Y axis may be referred to as rightward and leftward, respectively.

Visible light communication system 1 includes lighting device 10 and terminal 20 as illustrated in FIG. 1.

Lighting device 10 irradiates the surroundings with illumination light, to illuminate the area around lighting device 10. Light emitted by lighting device 10 is illumination light (hereinafter, also referred to as "communication light") which includes a visible light communication signal indicating identification information for uniquely identifying lighting device 10. Specifically, identification information is, for example, unique identification information uniquely assigned to lighting device 10 in advance or positional information indicating the position where lighting device 10 is installed. An example of a light source of lighting device 10 is a light emitting diode (hereinafter, also referred to as an LED).

Lighting device 10 includes panel 11 and light source unit 15. In addition, lighting device 10 may include partition plate 12.

Light source unit 15 includes light sources which emit communication light through panel 11. More specifically, light source unit 15 includes light source S1 which emits communication light L1 and light source S2 which emits communication light L2. Here, communication light L1 includes a visible light communication signal (hereinafter, also simply referred to as a signal) indicating identification information I1 (first information) of lighting device 10. Communication light L2 includes a signal indicating identification information I2 (second information) of lighting device 10, which is different from identification information I1 included in light emitted from light source S1.

Light source S1 emits light which includes a signal indicating identification information I1 Light source S2 emits light which includes a signal indicating identification information I2 different from identification information I1, and is disposed at a position different from a position of light source S1. For example, light source S1 is disposed on the negative side of the Y axis, and light source S2 is disposed on the positive side of the Y axis.

Furthermore, light emitted from these light sources travels through space 13 inside panel 11, and exits through the surface of panel 11 from lighting device 10.

In addition to light sources S1 and S2, light source unit 15 also has elements necessary for the light sources to emit light, such as a power unit (not illustrated) which supplies power for light sources S1 and S2 to emit light, and signal generators (not illustrated in FIG. 1) which generate signals to be included in communication light that the light sources emit. Note that lighting device 10 is assumed to be installed on a ceiling, wall, or pillar in a manner such that the top surface (which can be seen from the positive side of the Z axis) of light source unit 15 faces the ceiling when in use.

Panel 11 is a light-transmissive member through which illumination light emitted by lighting device 10 exits. Panel 11 has two spaced-apart rectangular flat faces, for example. In other words, panel 11 includes rectangular flat faces spaced apart and disposed opposite from one another. Note that panel 11 may include three or more flat plates or a curved plate-like portion, and the flat faces may have a triangle or pentagonal shape or a shape different from those, rather than a rectangular shape. The following describes the case where panel 11 includes rectangular flat faces spaced apart and disposed opposite from one another.

Space 13 inside panel 11 may be hollow or filled with light guide material.

Note that the flat faces spaced apart and disposed opposite from one another may be referred to as a first face and a second face.

Panel 11 includes region R1 (first portion) and region R2 (second portion). Region R1 transmits light emitted by light source S1, to allow communication light L1 to exit from lighting device 10. Region R2 transmits light emitted by light source S2, to allow communication light L2 to exit from lighting device 10, and is at a position different from a position of region R1. Note that the above regions in panel 11 may be referred to as portions of panel 11.

More specifically, panel 11 includes two regions R1 and two regions R2. The first face includes one of two regions R1, and the second face includes the other of two regions R1 across from the one of two regions R1. Furthermore, the first face includes one of two regions R2, and the second face includes the other of two regions R2 across from the one of two regions R2.

In other words, panel 11, or specifically, the first face and the second face each include region R1, on the negative side of the Y axis and region R2 on the positive side of the Y axis. Accordingly, regions R1 and R2 can be both viewed from terminal 20 at the same time.

An outer surface of panel 11 may have information, such as text and a graphic, to be viewed by a person, for instance. The portion having text or a graphic as described above may partially transmit light or may block light.

Lighting device 10 emits light through two types of regions, namely regions R1 and R2, to improve the accuracy of positional information which a terminal in visible light communication system 1 obtains, using the method described below.

Note that regions R1 and R2 may be at different positions in a direction crossing the vertical direction of lighting device 10 in use (e.g., in the direction in FIG. 1). This is because the terminal mproves the accuracy of positional information by processing based on the positional relationship between regions R1 and R2 viewed from the terminal.

Partition plate 12 is a planar member for keeping light from the light sources separate in space 13 inside panel 11. Partition plate 12 may include material which does not transmit light, and the material may reflect or absorb light. Material which reflects light has an advantageous effect of increasing the amount of light emitted through the regions.

Since light sources S1 and S2 are disposed in light source unit 15 as described above, communication light L1 and communication light L2 emitted from the light sources travel through space 13, and reach regions R1 and R2, respectively. However, if communication light L1 and communication light L2 are mixed and emitted from one of the regions (for example, region R1), terminal 20 fails to obtain both or one of identification information I1 and I2.

In view of this, partition plate 12 divides space 13 into two subspaces, namely a subspace which includes light source S1 and region R1 and a subspace which includes light source S2 and region R2, thus preventing the mixture of light emitted from light sources S1 and S2 in space 13. In other words, partition plate 12 prevents light emitted by light source S1 from reaching region R2, and prevents light emitted by light source S2 from reaching region R1. As a result, communication light L1 and communication light L2 separately reach terminal 20 without being mixed, which increases the probability of terminal 20 successfully obtaining identification information.

Note that if partition plate 12 blocks light from at least one of the two subspaces toward the other, in other words, if partition plate 12 prevents light from at least one of the two subspaces from reaching the other, the probability of terminal 20 successfully obtaining information increases.

Partition plate 12 is disposed along a plane crossing an imaginary line segment that connects light sources S1 and S2. Partition plate 12 is disposed extending between light sources S1 and S2, parallel to the XZ plane, for example, as illustrated in FIG. 2.

Terminal 20 receives communication light transmitted by lighting device 10, and obtains a signal from the received communication light and information from the obtained signal. If terminal 20 receives communication light L1 and L2 emitted from lighting device 10, terminal 20 obtains identification information I1 and I2 from communication light L1 and L2, respectively. Based on obtained identification information I1 and I2, terminal 20 presents, to a user, information indicating the position of terminal 20.

Lighting device 10 in an image captured by terminal 20 at position 20A appears differently from lighting device 10 in an image captured by terminal 20 at position 20B. Terminal 20 can obtain positional information of terminal 20 with sufficient accuracy, utilizing such a difference. A detailed description of a method for obtaining positional information is given later.

Terminal 20 receives communication light through an image sensor. Terminal 20 is achieved by, for example, an information terminal which includes an image sensor. Examples of terminal 20 include a mobile phone terminal, a smartphone (high-performance mobile phone terminal), and a personal computer (PC).

Figure 3:
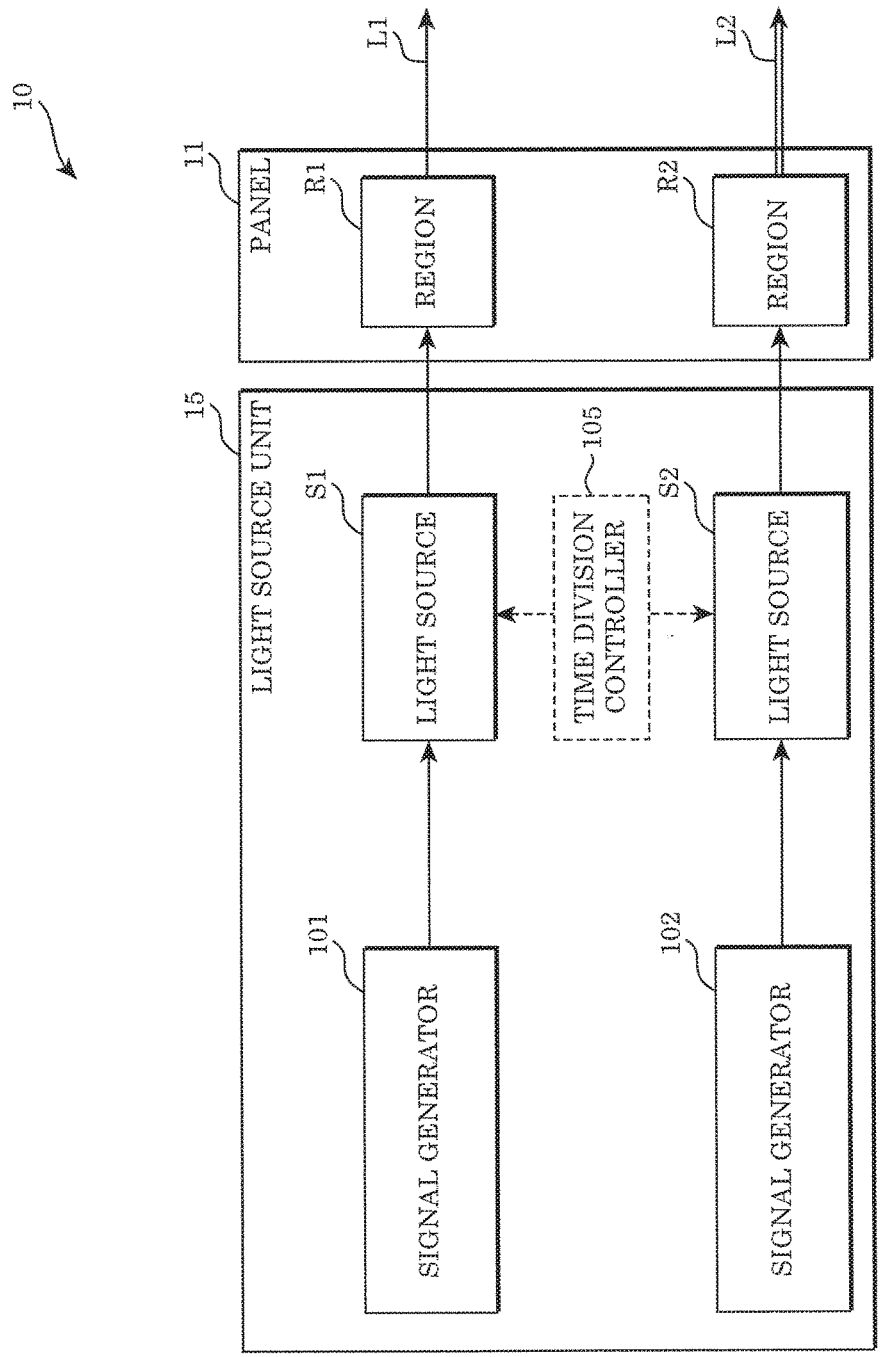
FIG. 3 is a block diagram illustrating functionality of the lighting device according to Embodiment 1.

FIG. 3 is a block diagram illustrating functionality of lighting device 10 according to the present embodiment.

Lighting device 10 includes panel 11 and light source unit 15 as illustrated in FIG. 3. Panel 11 includes regions R1 and R2. Light source unit 15 includes signal generators 101 and 102, and light sources S1 and S2. Note that light source unit 15 may further include time division controller 105 (discussed in more detail below).

Signal generator 101 generates an electrical signal which includes a visible light communication signal corresponding to identification information I1 of lighting device 10. This electrical signal has an amplitude corresponding to the intensity of communication light emitted from light source S1. The visible light communication signal includes identification information of lighting device 10. The visible light communication signal is in accordance with, for example, CP-1223, which is a protocol for visible light communication signals in the visible light beacon systems.

Signal generator 102 generates an electrical signal which includes a visible light communication signal corresponding to identification information I2 of lighting device 10. This electrical signal has an amplitude corresponding to the intensity of communication light emitted from light source S2. Identification information I2 is identification information of lighting device 10, and is different from identification information I1. Again, the visible light communication signal is in accordance with, for example, CP-1223, which is a protocol for visible light communication signals in the visible light beacon systems.

Light source S1 emits communication light by outputting light having an intensity that varies according to the amplitude of an electrical signal generated by signal generator 101. The electrical signal generated by signal generator 101 includes identification information I1. Accordingly, the light output by light source S1 includes a signal indicating identification information I1. Note that if light source S1 cannot obtain an electrical signal from signal generator 101, light source S1 may emit illumination light which does not include a signal or may emit no light.

Light source S2 emits communication light by outputting light having an intensity that varies according to the amplitude of an electrical signal generated by signal generator 102. The electrical signal generated by signal generator 102 includes identification information I2. Light source S2 is the same as light source S1 in other respects.

Light sources S1 and S2 are achieved by LEDs, for example.

Optional time division controller 105 performs time division control such that regions R1 and R2 emit communication light in a time division manner. Specifically, time division controller 105 alternates a first state where communication light is emitted through only region R1 among regions R1 and R2 and a second state where communication light is emitted through only region R2 among regions R1 and R2, by controlling light sources S1 and S2. For example, time division controller 105 alternates the first state and the second state at intervals of about several milliseconds to about several seconds, by controlling light sources S1 and S2. Note that while no communication light is emitted through regions R1 and R2, illumination light which does not include a signal may be emitted through regions R1 and R2 or no light may be emitted.

Specifically, time division controller 105 performs time division control by turning on and off the output of communication light from light sources S1 and S2 at appropriate timing. Time division controller 105 switches a first period corresponding to the first state and a second period corresponding to the second state in a repeating cycle, for example. In the first period, time division controller 105 turns on the output of communication light by light source S1 and turns off the output of communication light by light source S2. Furthermore, in the second period, time division controller 105 turns off the output of communication light by light source S1 and turns on the output of communication light by light source S2. In this manner, only one of light sources S1 and S2 is allowed to output communication light at a time. Note that a period may be provided in which light sources S1 and S2 both output no communication light.

Accordingly, lighting device 10 can prevent terminal 20 from failing to obtain, identification information I1 and I2 even if a portion of communication light emitted by light source S1 reaches region R2, and the portion of communication light emitted by light source S1 and communication light emitted by light source S2 are both emitted through region R2.

Note that time division controller 105 may control signal generators 101 and 102, in addition to controlling light sources S1 and S2 or instead of controlling light sources S1 and S2. Specifically, time division controller 105 allows signal generator 101 to output a signal in the first period, and prevents (inhibits) signal generator 102 from outputting a signal in the first period. Furthermore, time division controller 105 prevents (inhibits) signal generator 101 from outputting a signal in the second period, and allows signal generator 102 to output a signal in the second period. In this manner, only one of light sources S1 can S2 is allowed to output communication light at a time.

Region R1 is a partial region of panel 11, and transmits a portion of or all the light emitted from light source S1. In this manner, region R1 allows communication light L1 which includes identification information I1 to exit from lighting device 10.

Region R2 is a partial region of panel 11, which includes a portion other than region R1. Region R2 transmits a portion of or all the light emitted from light source S2, to allow communication light L2 which includes identification information I2 to exit from lighting device 10.

Figure 4:
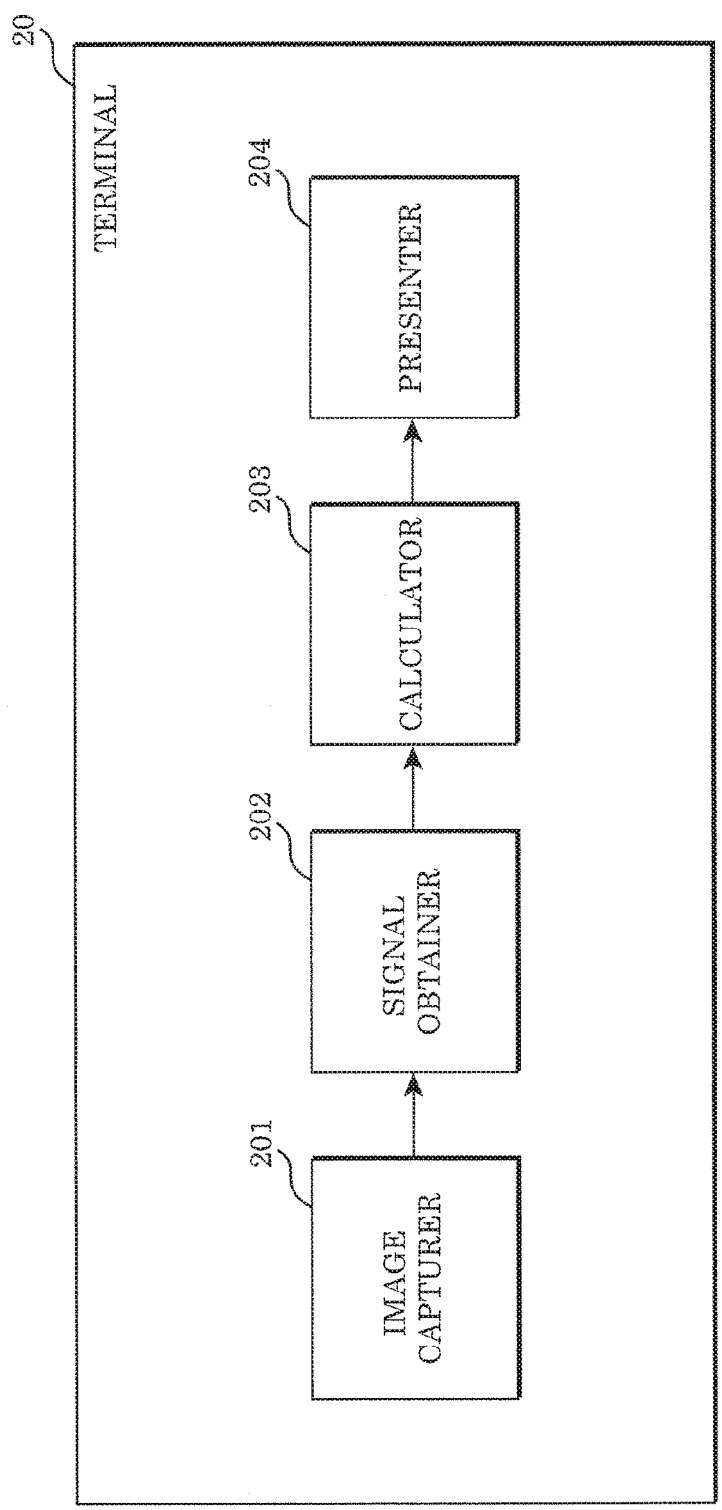
FIG. 4 is a block diagram illustrating functionality of a terminal according to Embodiment 1.

FIG. 4 is a block diagram illustrating functionality of terminal 20 according to the present embodiment.

Terminal 20 includes image capturer 201, signal obtainer 202, calculator 203, and presenter 204 as illustrated in FIG. 4.

Image capturer 201 generates an image by imaging the surroundings. Image capturer 201 generates an image in which lighting device 10 is a subject, by imaging lighting device 10. Image capturer 201 is achieved by an image sensor, for example.

Signal obtainer 202 obtains a signal included in communication light from lighting device 10, based on an image generated by image capturer 201, and obtains identification information from the signal, assuming that the obtained signal is a visible light communication signal. Signal obtainer 202 obtains identification information I1 and I2 emitted through the respective regions in the image while lighting device 10 is emitting communication light through regions R1 and R2 in accordance with, for example, the CP-1223 protocol. The positional relationship between regions R1 and R2 in the image generated by image capturer 201 differs depending on whether terminal 20 is at position 20A or at position 20B in FIG. 2. A description of an image generated by image capturer 201 is given later.

Calculator 203 calculates the position of terminal 20, based on identification information obtained by signal obtainer 202. Specifically, calculator 203 obtains, in advance, information indicating the orientation of installed lighting device 10 (for example, information indicating direction from region R1 to region R2 or direction from region R2 to region R1). Calculator 203 calculates the position of terminal 20, based on the orientation information obtained in advance, identification information I1 and I2, and the positional relationship between regions R1 and R2 in an image generated by image capturer 201. A description of the position calculated by calculator 203 and the accuracy of the calculated position is given later.

Presenter 204 presents, to a user, information indicating the position of terminal 20 calculated by calculator 203. For example, presenter 204 displays a map image which includes the position where lighting device 10 is installed, and furthermore an image (such as a mark) which indicates the position of terminal 20 on the map. Note that if information has been obtained which indicates a destination toward which a user is currently heading, presenter 204 may also display an image for navigation to that destination. Also, presenter 204 may merely display numerical values which simply indicate the latitude and longitude, as information indicating the position of terminal 20.

Figure 5:
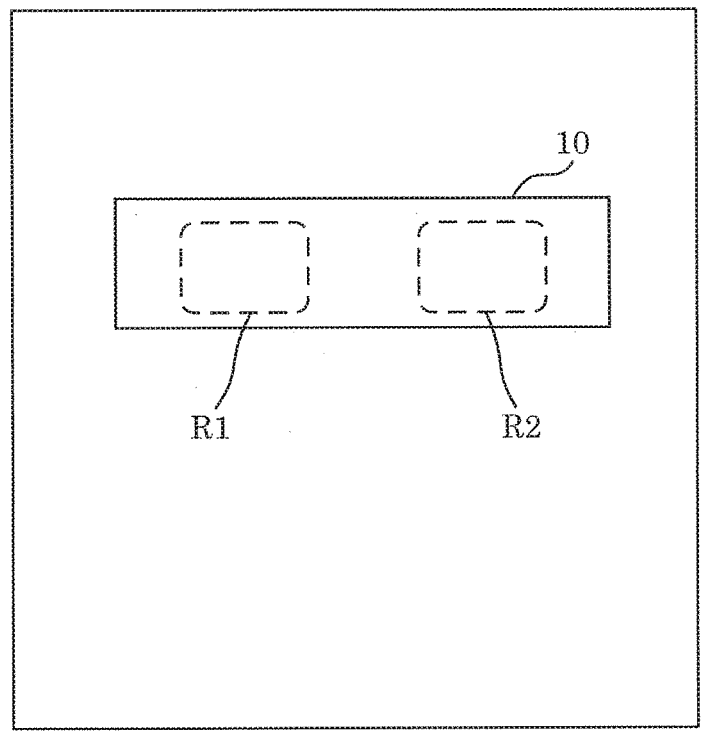
FIG. 5 is an explanatory diagram illustrating a first example of an image of the lighting device captured by the terminal according to Embodiment 1.
Figure 6:
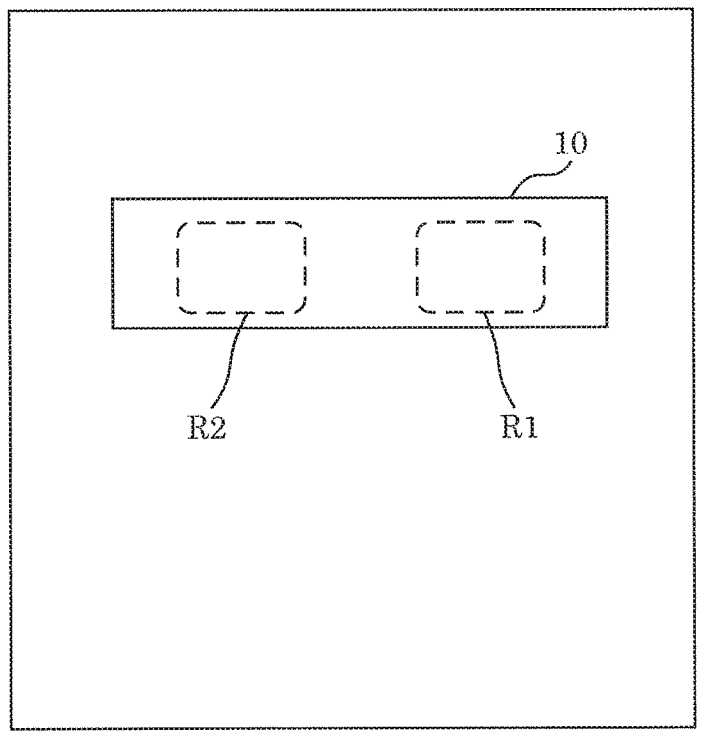
FIG. 6 is an explanatory diagram illustrating a second example of an age of the lighting device captured by the terminal according to Embodiment 1.

The following describes an image which image capturer 201 generates, with reference to FIGS. 5 and 6. As described above, an image generated by image capturer 201 differs depending on whether terminal 20 is at position 20A or position 20B in FIG. 2.

FIG. 5 is an explanatory diagram illustrating a first example of an image of lighting device 10 captured by terminal 20 according to the present embodiment. This shows an example of an image captured by image capturer 201 when terminal 20 is at position 20A in FIG. 2. Note that this image shows only lighting device 10 for the purpose of description, and excludes elements other than the device (for example, light source unit 15). Similar processing can be performed even if an image includes subjects other than lighting device 10.

Lighting device 10 which is a subject of the image illustrated in FIG. 5 includes region R1 on the left of the drawing and region R2 on the right of the drawing.

FIG. 6 is an explanatory diagram illustrating a second example of an image of lighting device 10 captured by terminal 20 according to the present embodiment. This shows an example of an image captured by image capturer 201, when terminal 20 is at position 20B in FIG. 2.

Lighting device 10 which is a subject of the image illustrated in FIG. 6 includes region R2 on the left of the drawing and region R1 on the right of the drawing.

Calculator 203 determines whether terminal 20 was at position 20A or position 20B when terminal 20 generated the image, by determining whether regions R1 and R2 appear on the right and left or on the left and right of the image. Specifically, calculator 203 determines that terminal 20 was at position 20A if the image is as shown in FIG. 5, and determines that terminal 20 was at position 20B if the image is as shown in FIG. 6.

Calculator 203 calculates the position of terminal 20 when the image was generated, using the position of lighting device 10 determined from identification information I1 or I2 and the orientation information obtained in advance.

Note that although the above has described, with reference to FIGS. 2, 5, and 6, the cases where terminal 20 is at positions 20A and 20B where terminal 20 faces the flat part of panel 11 from the front, similar processing is possible even if terminal 20 is at a position where terminal 20 obliquely faces panel 11. Furthermore, if terminal 20 is at a position where terminal 20 obliquely faces panel 11, lighting device 10 in an image captured by image capturer 201 appears to be a trapezoid, a parallelogram, or a typical quadrangle, rather than a rectangle. Even in such a case, the same also applies and calculator 203 determines the position of terminal 20 by determining the lateral positional relationship between regions R1 and R2. Thus, calculator 203 can determine whether terminal 20 is on the positive side or the negative side of the X axis relative to lighting device 10.

Figure 7:
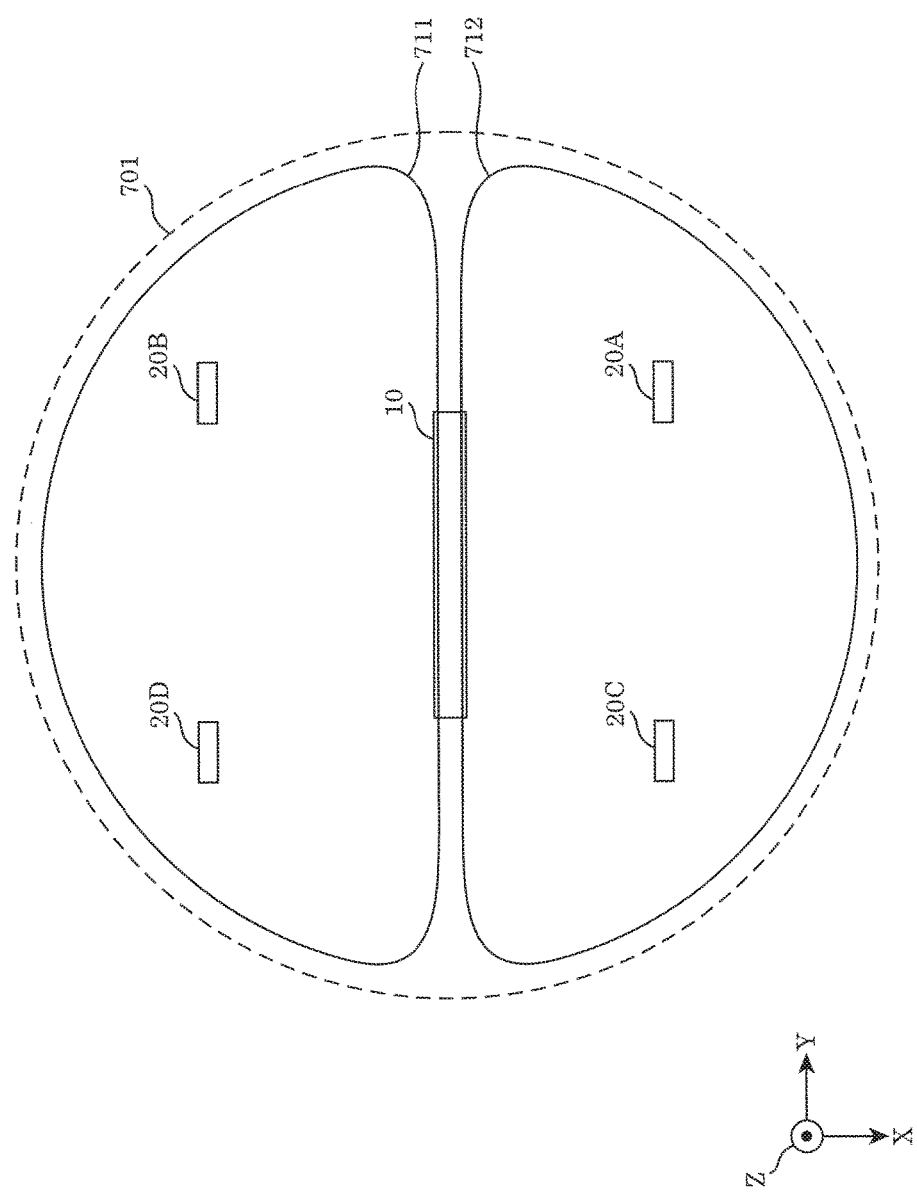
FIG. 7 is an explanatory diagram of accuracy of a position determined by the terminal according to Embodiment 1.

FIG. 7 is an explanatory diagram of the accuracy of a position determined by the terminal according to the present embodiment. FIG. 7 illustrates visible light communication system 1 in top view, where lighting device 10 is installed in the center of the drawing and terminals are disposed around lighting device 10.

Using a technique (hereinafter, referred to as a related art) in which the position determination method according to the present embodiment is not used, a terminal which has received communication light from lighting device 10 can determine that the terminal is positioned somewhere in region 701 which communication light from lighting device 10 reaches, but the terminal cannot determine where in region 701 the terminal is positioned.

If the position determination method according to the present embodiment is used, terminal 20 which has received communication light from lighting device 10 can further determine the position of the terminal by determining which one of the two flat faces of panel 11 of lighting device 10 communication light received by terminal 20 is emitted through, or in other words, which one of the two flat faces of panel 11 of lighting device 10 the terminal images or views from the position. Specifically, by analyzing the positional relationship between regions R1 and R2 in the image acquired by image capturer 201, terminal 20 can determine whether terminal 20 is in region 711 or region 712 in FIG. 7. Accordingly, terminal 20 can determine the position of terminal 20 with higher accuracy than with the related art.

As described above, lighting device 10 according to the present embodiment includes light source S1 which emits light that includes a visible light communication signal indicating identification information I1, and light source S2 which is disposed at a position different from a position of light source S1, and emits light that includes a visible light communication signal indicating identification information I2 different from identification information I1.

In this manner, lighting device 10 transmits, to terminal 20, two different pieces of identification information through visible light communication using light emitted from the two light sources. Terminal 20 obtains the two pieces of identification information by receiving this light, and determines the position of terminal 20 based on the identification information and the positional relationship between the two light sources viewed from the terminal. In this manner, terminal 20 can determine the position of terminal 20 with higher accuracy than the case where lighting device 10 transmits one piece of identification information (as with the related art). Accordingly, lighting device 10 can improve the accuracy of positional information which terminal 20 obtains.

For example, lighting device 10 further includes panel 11 which is light transmissive, and panel 11 includes region R1 which transmits light emitted by light source S1, to allow the light to exit from lighting device 10, and region R2 which is at a position different from a position of region R1, and transmits light emitted by light source S2, to allow the light to exit from lighting device 10.

In this manner, lighting device 10 emits communication light which includes identification information I1 through region R1 in panel 11, and also emits communication light which includes identification information I2 through region R2 in panel 11. Terminal 20 obtains the two pieces of identification information by receiving the light emitted through region R1 in panel 11 and the light emitted through region R2 in panel 11, and determines the position of terminal 20, based on the identification information and the positional relationship between regions R1 and R2 viewed from the terminal. Accordingly, lighting device 10 can improve the accuracy of positional information which terminal 20 obtains.

For example, regions R1 and R2 are at different positions in a direction crossing the vertical direction of lighting device 10 in use.

In this manner, the positional relationship between regions R1 and R2 viewed from terminal 20 changes according to a change in the relative position of terminal 20 with respect to lighting device 10. Based on the change in the positional relationship, terminal 20 can improve the accuracy of positional information to obtain.

For example, panel 11 includes a first face and a second face which are two flat faces spaced apart and disposed opposite from one another, panel 11 includes two regions R1 and two regions R2, the first face includes one of two regions R1 and one of two regions R2, and the second face includes the other of two regions R1 across from the one of two regions R1, and the other of two regions R2 across from the one of two regions R2.

In this manner, terminal 20 determines, based on the positional relationship between regions R1 and R2 viewed from terminal 20, a position of the terminal by determining which of the first face and the second face terminal 20 can be viewed from the position. Accordingly, terminal 20 can improve the accuracy of positional information to obtain.

For example, lighting device 10 further includes a partition plate which at least one of prevents light emitted by light source S1 from reaching region R2 and prevents light emitted by light source S2 from reaching region R1.

In this manner, lighting device 10 divides, with the partition plate, the space where light emitted by light source S1 and light emitted by light source S2 travel, thus preventing the above light being mixed and emitted through region R1 or R2. Accordingly, terminal 20 can more accurately receive light emitted by light sources S1 and S2, and consequently can improve the accuracy of positional information to obtain.

For example, lighting device 10 further includes time division controller 105 which alternates a first state where only light source S1 among light sources S1 and S2 emits light and a second state where only light source S2 among light sources S1 and S2 emits light by controlling light sources S1 and S2.

In this manner, lighting device 10 separates timings at which light source S1 emits light and light source S2 emits light, thus preventing the light from being mixed and emitted through region R1 or R2. Accordingly, terminal 20 can more accurately receive light emitted by light sources S1 and S2, and consequently, improve the accuracy of positional information to obtain.

For example, light sources S1 and S2 emit light to allow terminal 20 having received light which has exited through regions R1 and R2 from lighting device 10 to (i) generate an image in which lighting device 10 is a subject by imaging lighting device 10 using received light, and (ii) calculate the position of terminal 20, based on the positional relationship between regions R1 and R2 in the generated image.

In this manner, terminal 20 obtains the positional relationship between regions R1 and R2 from the image generated by imaging lighting device 10. With this method, terminal 20 can more specifically improve the accuracy of positional information to obtain.

For example, an outer surface of panel 11 has at least one of text and a graphic to be viewed by a person.

In this manner, lighting device 10 improves the accuracy of positional information which terminal 20 obtains, and also conveys information to the person with the text and/or graphic.

Furthermore, visible light communication system 1 according to the present embodiment includes: lighting device 10 described above; and terminal 20 which obtains information from lighting device 10 through visible light communication, wherein terminal 20 includes: image capturer 201 which generates an image in which lighting device 10 is a subject by imaging lighting device 10 through reception of light emitted by light source S1 and light emitted by light source S2; signal obtainer 202 which obtains identification information I1 and identification information I2, based on the image generated, by image capturer 201; calculator 203 which calculates the position of terminal 20 based on a positional relationship between a position where the light from light source S1 has been received, and a position where the light from light source S2 has been received in the image generated by image capturer 201; and presenter 204 which presents information indicating the position of terminal 20 calculated by calculator 203.

This achieves equivalent advantageous effects as those achieved by lighting device 10 described above.

Variation 1 of Embodiment 1

This variation describes a lighting device and a visible light communication system which further improve the accuracy of positional information that a terminal obtains, compared with the case of Embodiment 1.

Figure 8:
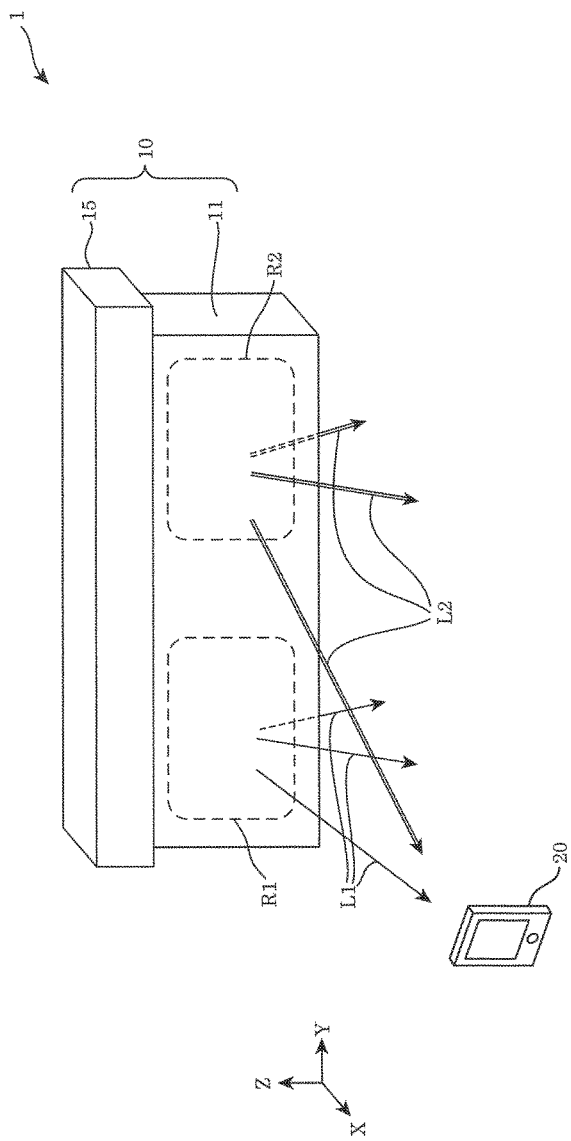
FIG. 8 is a schematic view of a visible light communication system according to Variation 1 of Embodiment 1.

FIG. 8 is a schematic view of a visible light communication system according to this variation. Although visible light communication system 1 has the same constituent elements as those of Embodiment 1 (FIG. 1), terminal 20 is at a different position from that in Embodiment 1.

Specifically, FIG. 8 illustrates the case where terminal 20 is at a position where terminal 20 obliquely faces panel 11. Terminal 20 of visible light communication, system 1 according to this variation determines the position of terminal 20, based on the shape of panel 11 as the panel appears.

Figure 9:
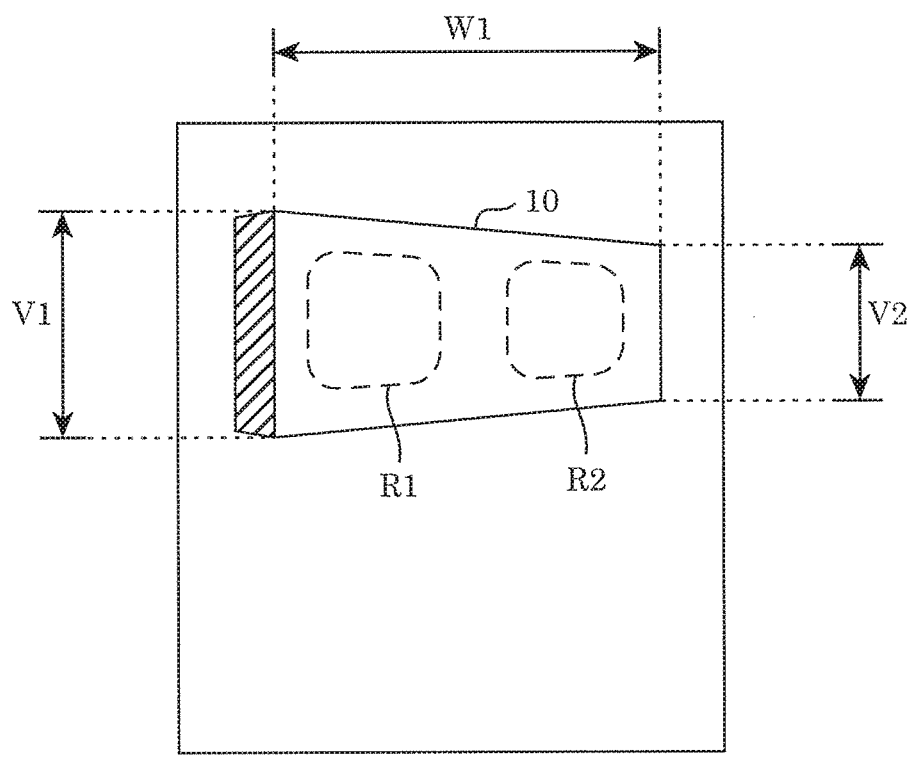
FIG. 9 is an explanatory diagram illustrating an example of an image of the lighting device captured by a terminal according to Variation 1 of Embodiment 1.

FIG. 9 is an explanatory diagram illustrating an example of an image of a lighting device captured by a terminal according to Variation 1.

Lighting device 10 which is a subject of the image illustrated in FIG. 9 has a trapezoidal shape. Lighting device 10 appears trapezoidal because terminal 20 is at a position where terminal 20 obliquely faces panel 11, rather than a position in front of a flat face of panel 11.

Calculator 203 determines whether terminal 20 was at position 20A or position 20B when terminal 20 captured this image, by determining whether regions R1 and R2 appear on the right and left or the left and right of the image, as with calculator 203 according to Embodiment 1.

Calculator 203 further obtains the position of terminal 20 relative to lighting device 10 with sufficient accuracy, based on the shape of lighting device 10 in the image. Specifically, calculator 203 obtains in advance information on the shape of lighting device 10 (such as the length in the X direction and the length in the Y direction) and information on the direction from regions R1 to R2. Then, calculator 203 calculates the distance between lighting device 10 and terminal 20 along the straight line therebetween and the angle formed by this straight line and a reference line (for example, X axis), based on the above information obtained in advance, width (length) W1 of lighting device 10 in the horizontal direction, and lengths V1 and V2 of the sides of lighting device 10 extending in the vertical direction in the image. This calculation can be performed with a conventional geometric method, and thus a further description thereof will not be given here.

Note that geometric information such as lengths of the four sides of lighting device 10 in the image or angles formed by adjacent sides of lighting device 10 in the image may be used in the above calculation, instead of or in addition to W1, V1, and V2 mentioned above.

A description of the accuracy of positional information in this variation is given again with reference to FIG. 7.

If the position determination method according to this variation is used, terminal 20 which has received communication light from lighting device 10 can determine which position in FIG. 7 terminal 20 is at. Specifically, terminal 20 can determine which of positions 20A, 20B, 20C, and 20D) terminal 20 is at. Accordingly, terminal 20 can determine the position of terminal 20 with higher accuracy than the case in Embodiment 1.

As described above, in visible light communication a system 1 according to the present embodiment, calculator 203 further compares the shape of lighting device 10 with the shape of lighting device 10 in an image, to calculate the position and the orientation of terminal 20, and presenter 204 presents information indicating the orientation calculated by calculator 203, in addition to information indicating the position of terminal 20.

In this manner, terminal 20 obtains two pieces of identification information, namely first information and second information, and determines the position of terminal 20, based on the pieces of identification information and the positional relationship between the first portion and the second portion viewed from the terminal and the shape of lighting device 10 as it appears. Accordingly, lighting device 10 can further improve the accuracy of positional information which terminal 20 obtains.

Variation 2 of Embodiment 1

This variation describes navigation achieved using visible light communication system 1 according to Embodiment 1 or Variation 1 of Embodiment 1. With this navigation, terminal 20 obtains, in advance, information indicating the destination of a user and map information, and based on such, information, presents to the user the route to reach the destination from the current position of terminal 20.

Figure 10:
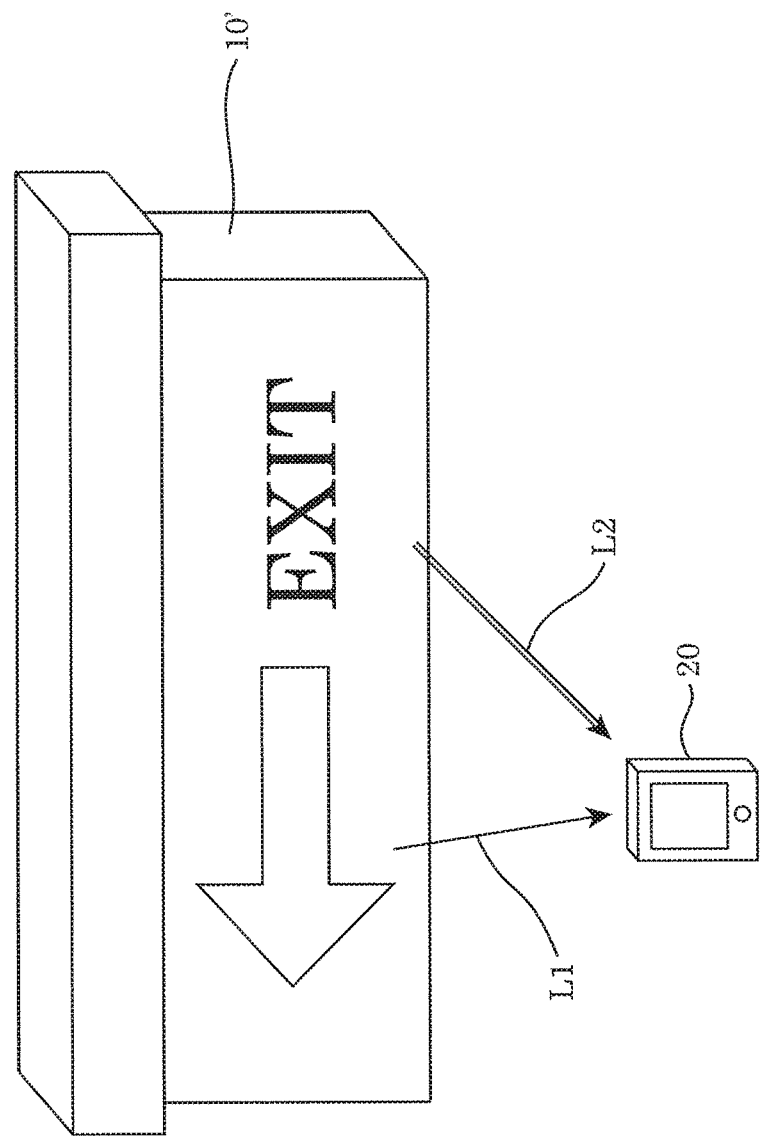
FIG. 10 is an external view illustrating a lighting device according to Variation 2 of Embodiment 1.

FIG. 10 is an external view illustrating lighting device 10' according to this variation.

Lighting device 10' is obtained by giving text and a graphic for navigation (sign) on panel 11 of lighting device 10 according to Embodiment 1. The inner side of panel 11 is irradiated with light emitted from, for instance, light source S1 in lighting device 10', and a portion of or all the light exits through panel 11 from lighting device 10'. Accordingly, people can view the text and graphic given on panel 11 also in the dark.

Furthermore, communication light L1 emitted by lighting device 10' includes identification information I1, for instance. Accordingly, terminal 20 receives light emitted from lighting device 10', to obtain identification information I1.

Figure 11:
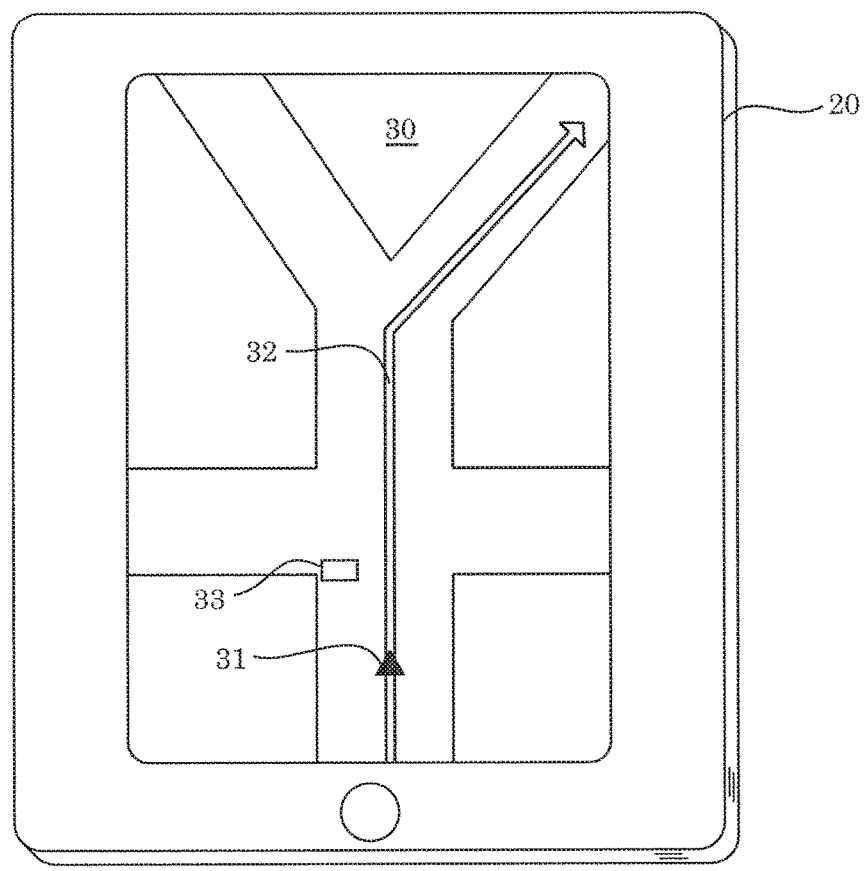
FIG. 11 is an explanatory diagram illustrating navigation by a terminal according to Variation 2 of Embodiment 1.

FIG. 11 is an explanatory diagram illustrating navigation by a terminal according to this variation.

FIG. 11 shows graphic 31 (black triangle mark indicating the current position of terminal 20, graphic 32 (outlined arrow) indicating a route for a user to reach the destination, and graphic 33 indicating the position of lighting device 10' on the map, in addition to map image 30.

Terminal 20 presents to the user a route for the user to reach the destination in the form of image, using obtained identification information and information indicating the destination of the user and map information obtained in advance.

Note that the meaning of the text and graphic given on panel 11 and identification information I1 included in communication light L1 may have a certain degree of relation or may not have any relation. For example, the text and graphic given on panel 11 illustrated in FIG. 10 show navigation information indicating "exit on the left". In contrast, identification information I1 indicates identification information of lighting device 10'. Such navigation information and, identification information do not have direct relation.

As described above, visible light communication system 1 according to the present embodiment improves the accuracy of positional information which terminal 20 obtains, thus navigating a user appropriately using terminal 20.

Embodiment 2

The present embodiment describes a visible light communication system, and a lighting device which improves the accuracy of positional information that a terminal obtains and has a configuration different from the lighting device according to Embodiment 1.

Note that the same numerals may be given to the same constituent elements as those of Embodiment 1 and the variations thereof, and a detailed description of the constituent elements may be omitted.

Figure 12:
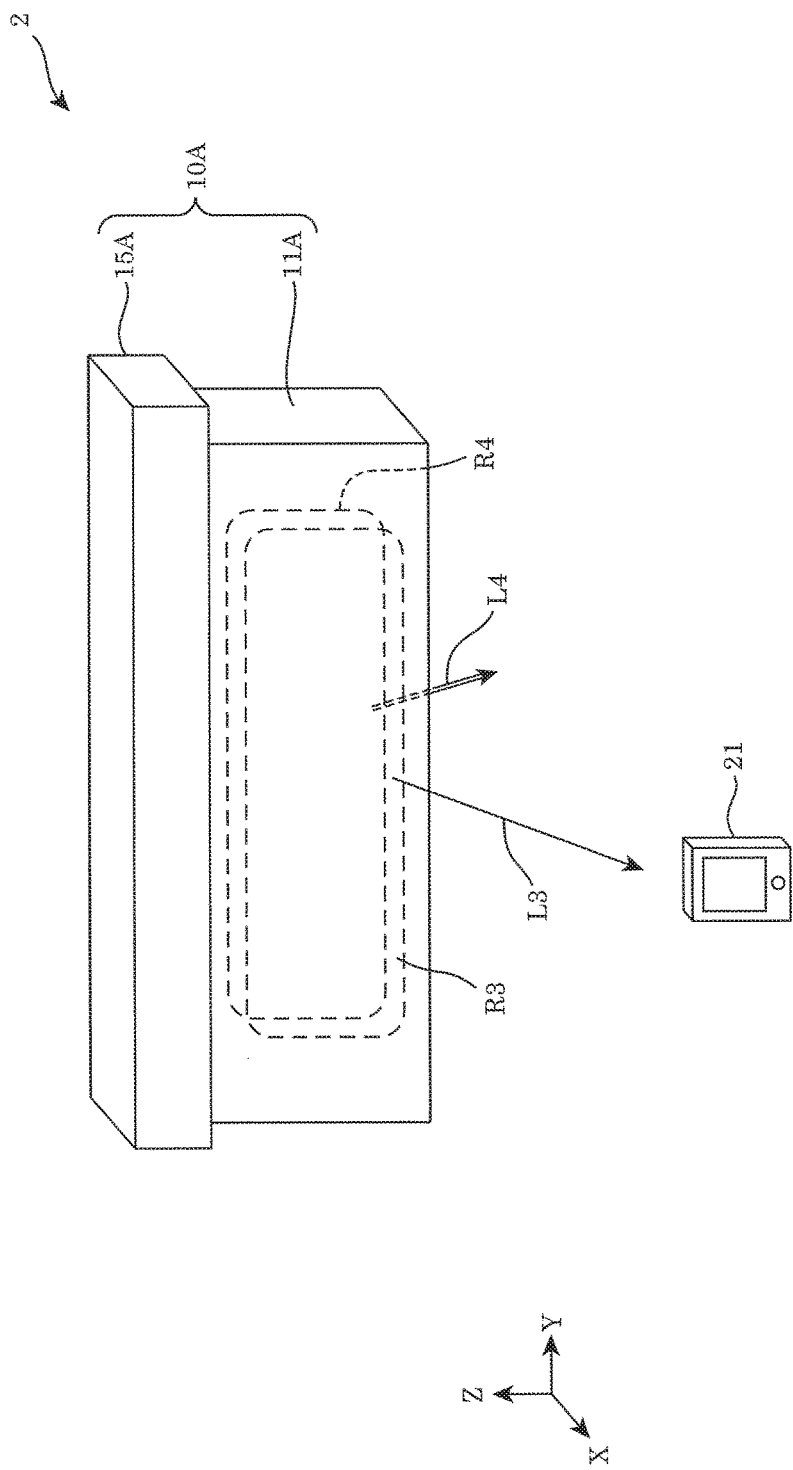
FIG. 12 is a schematic view of a visible light communication system according to Embodiment 2.
Figure 13:
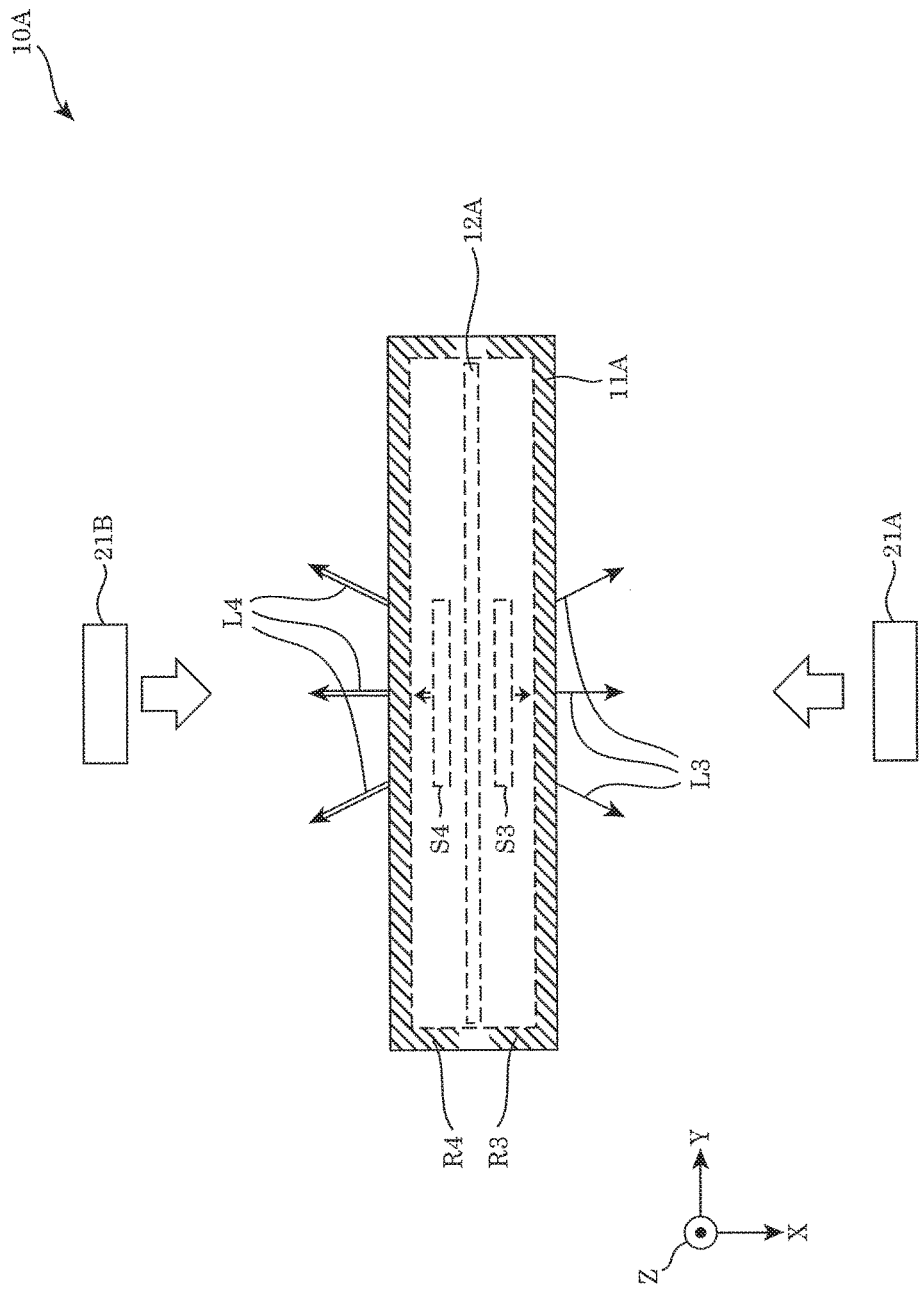
FIG. 13 is a schematic diagram illustrating a structure of a lighting device according to Embodiment 2.

FIG. 12 is a schematic view of visible light communication system 2 according to the present embodiment. FIG. 13 is a schematic diagram illustrating a structure of lighting device 10A according to the present embodiment. FIG. 13 illustrates the internal structure of lighting device 10A in top view.

Lighting device 10A irradiates the surroundings with illumination light in the same manner as lighting device 10, to illuminate the area around lighting device 10A. Lighting device 10A includes panel 11A and light source unit 15A. Lighting device 10A may also include partition plate 12A.

Panel 11A is a light-transmissive member which transmits illumination light with which lighting device 10A irradiates, in the same manner as panel 11. Panel 11A includes regions R3 and R4. More specifically, the first face includes region R3, and the second face includes region R4.

In other words, region R3 is included in the flat face on the positive side of the X axis, and region R4 is included in the flat face on the negative side of the X axis. In this manner, panel 11A includes regions R3 and R4 such that only one of the regions is viewed from terminal 20 at a time.

Panel 11A is the same as panel 11 in other respects.

Region R3 is a region through which communication light L3 is emitted which includes a signal indicating identification information I3 (first information) of lighting device 10A. Furthermore, region R4 is a region through which communication light L4 is emitted which includes a signal indicating identification information I4 (second information) of lighting device 10A which is different from identification information I3 included in the light emitted through region R3. Lighting device 10A emits light through these two regions, thus improving the accuracy of positional information which the terminal in visible light communication system 2 obtains.

Light source unit 15A includes light sources of communication light emitted, through panel 11A (regions R3 and R4). More specifically, light source unit 15A includes light source S3 which emits communication light L3 and light source S4 which emits communication light L4. Light sources S3 and S4 are disposed at positions suitable for emitting light toward regions R3 and R4. Specifically, light source S3 is disposed on the positive side of the X axis, and light source S4 is disposed on the negative side of the X axis. Light source unit 15A is the same as light source unit 15 in other respects.

Partition plate 12A is a planar member for keeping light from the light sources separate in the space surrounded by panel 11A. Partition plate 12A is disposed extending between light sources S3 and S4, parallel to the YZ plane, for example. Partition plate 12A is the same as partition plate 12 in other respects.

The functional blocks included in lighting device 10A are the same as those in Embodiment 1 (FIG. 4), and thus a description, thereof is omitted.

Terminal 21 receives communication light emitted by lighting device 10A, obtains a signal from the received communication light, and obtains information from the obtained signal. Terminal 21 presents to a user information indicating the position of terminal 21, based on obtained identification information 13 and 14. Processing until terminal 21 determines the information indicating the position thereof (processing by calculator 203) differs from the processing by terminal 20. A description of this processing is given later.

Figure 14:
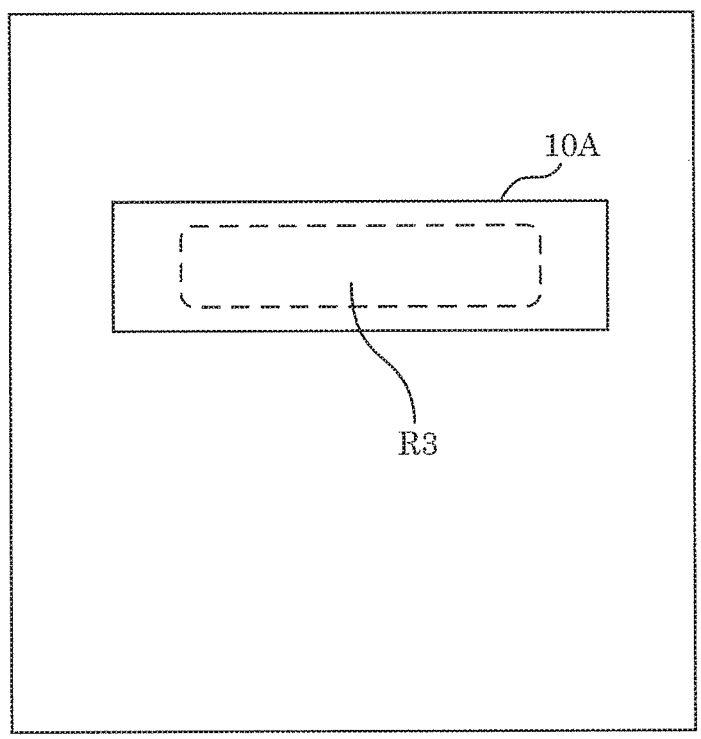
FIG. 14 is an explanatory diagram illustrating a first example of an image of the lighting device captured by a terminal according to Embodiment 2.

FIG. 14 is an explanatory diagram illustrating a first example of an image of lighting device 10A captured by terminal 21 according to the present embodiment. This shows an example of an image captured by image capturer 201, when terminal 21 is at position 21A in FIG. 13.

Lighting device 10A as the subject of the image illustrated in FIG. 14 includes region R3, but does not include region R4.

Figure 15:
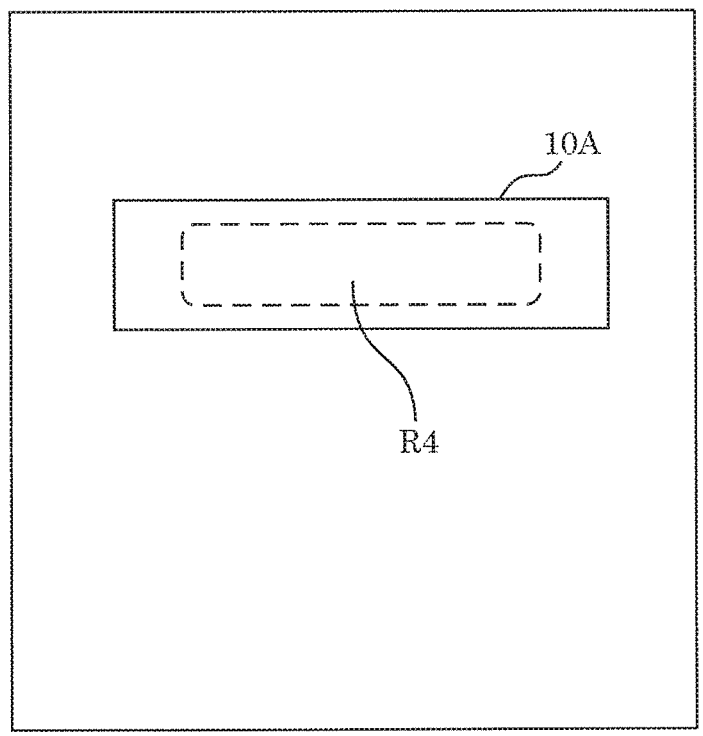
FIG. 15 is an explanatory diagram illustrating a second example of an image of the lighting device captured by the terminal according to Embodiment 2.

FIG. 15 is an explanatory diagram illustrating a second example of an image of lighting device 10A captured by terminal 21 according to the present embodiment. This shows an example of an image captured by image capturer 201, when terminal 21 is at position 21B in FIG. 13.

Lighting device 10A which is a subject of the image illustrated in FIG. 15 includes region R4, but does not include Region R3.

Calculator 203 determines whether terminal 20 was at position 21A or position 21B when terminal 20 captured this image, by determining which one of regions R3 and R4 is included in the image.

As described above, panel 11 of lighting device 10A according to the present embodiment includes a first face and a second face which are two flat faces spaced apart and disposed opposite from one another, and the first face includes region R3, and the second face includes region R4.

In this manner, based on which one of the first portion and the second portion is captured by image capturer 201 as determined by calculator 203, terminal 20 determines the position of terminal 20 at which terminal 20 views the first face or the second face. In this manner, terminal 20 can improve the accuracy of positional information which is obtained.

Embodiment 3

The present embodiment describes a lighting device which improves the accuracy of positional information that a terminal obtains, and has a configuration different from the lighting devices according to the above embodiments.

Figure 16:
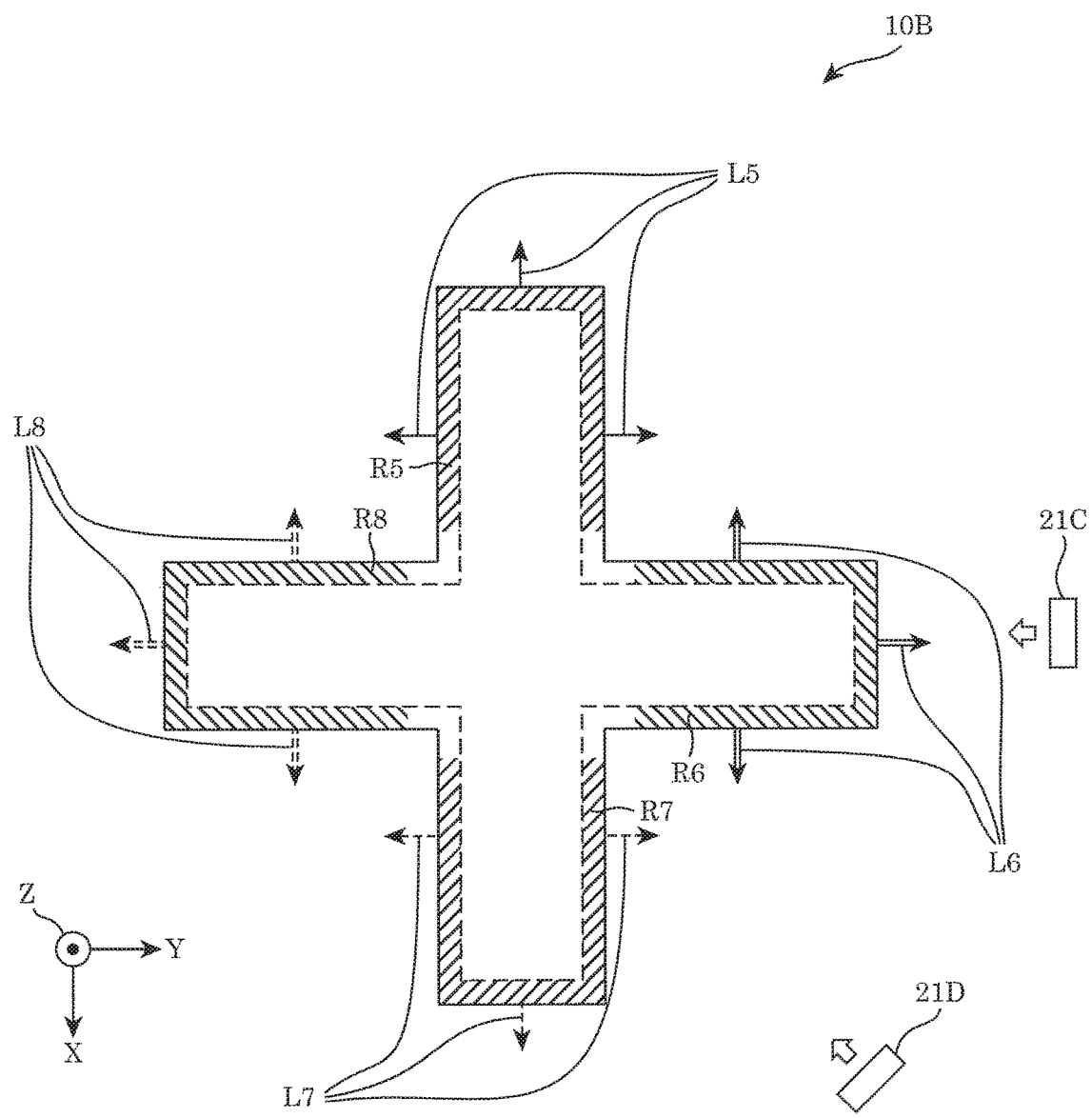
FIG. 16 is a schematic diagram illustrating a first example of a structure of a lighting device according to Embodiment 3.

FIG. 16 is a schematic diagram illustrating a first example of a structure of lighting device 10B according to the present embodiment.

Lighting device 10B illustrated in FIG. 16 has a cross shape in top view. Lighting device 10B has four branch portions each serving as a region which transmits light. Accordingly, lighting device 10B has a total of four regions R5 to R8, and communication light L5 to L8 which include different identification information are emitted through regions R5 to R8, respectively.

Note that although depictions of light sources and partition plates are omitted from FIG. 16, lighting device 10B includes light sources which emit light to the aforementioned regions, as with the above embodiments, and may include partition plates which partition the inner space into subspaces each including a light source and a region which transmits light from the light source to allow the light to exit from lighting device 10B.

A terminal generates an image by imaging lighting device 10B, and determines the position of the terminal, based on which of regions R5 to R8 is included in the generated image. Specifically, for example, an image generated by imaging lighting device 10B includes regions R5, R6, and R7 when the terminal is at position 21C. An image generated by imaging lighting device 10B when the terminal is at position 21D includes regions R6 and R7, Accordingly, the terminal determines the position of the terminal, using a difference of the images due to the difference in the position of the terminal.

Figure 17:
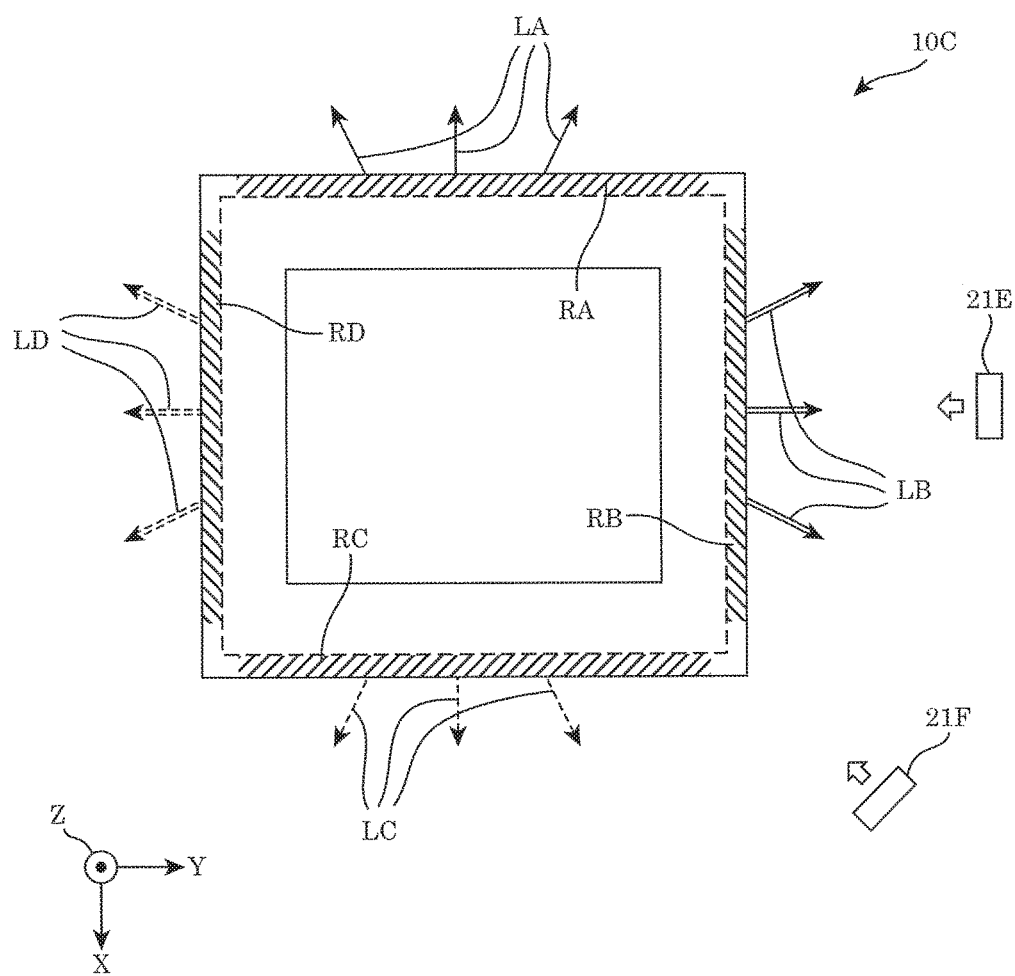
FIG. 17 is a schematic diagram illustrating a second example of a structure of a lighting device according to Embodiment 3.

FIG. 17 is a schematic diagram illustrating a second example of a structure of a lighting device according to the present embodiment.

Lighting device 10C illustrated in FIG. 17 has a rectangular shape (a hollow square shape) in top view. Lighting device 10C has four portions each forming one side of the rectangle, and each of the portions serves as a region which transmits light. Accordingly, lighting device 10B has a total of four regions RA to RD, and regions RA to RD emit communication light LA to LD, respectively, which include different identification information.

Note that depictions of light sources and partition plates are omitted from FIG. 17, as with FIG. 16.

The terminal generates an image by imaging lighting device 10C, and determines the position of the terminal, based on which of regions RA to R8 is included in the generated image. Specifically, for example, an image generated by imaging lighting device 10C when the terminal is at position 21E includes only region RB. Furthermore, an image generated by imaging lighting device 10C when the terminal is at position 21F includes regions RB and RC. Accordingly, the terminal determines the position of the terminal using a difference of images due to a difference in the position of the terminal.

As described above, lighting devices 10B and 10C according to the present embodiment allow the terminal to determine the position of the terminal more adequately.

Others

Although the lighting devices and the visible light communication systems have been hereinbefore described based on one or more embodiments, these embodiments are not intended to be limiting.

Note that these general and specific aspects according to the above embodiments may be implemented using a system, a method, an integrated circuit, a computer program, a computer-readable recording medium such as a CD-ROM, or any combination of systems, methods, integrated circuits, computer programs, or recording media.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device comprising:
a first light source which emits light that includes a visible light communication signal indicating first information;
a second light source which is disposed at a position different from a position of the first light source, and emits light that includes a visible light communication signal indicating second information different from the first information; and
a panel which is light transmissive,
wherein the panel includes:
a first portion which transmits the light emitted by the first light source, to allow the light emitted by the first light source to exit from the lighting device,
a second portion which is at a position different from a position of the first portion, and transmits the light emitted by the second light source, to allow the light emitted by the second light source to exit from the lighting device, and
a first face and a second face which are two flat faces spaced apart and disposed opposite from one another,
wherein the first portion comprises two first portions,
the second portion comprises two second portions,
the first face includes one of the two first portions and one of the two second portions, and
the second face includes the other of the two first portions across from the one of the two first portions, and the other of the two second portions across from the one of the two second portions.

2. The lighting device according to claim 1,
wherein the position of the first portion and the position of the second portion are different in a direction crossing a vertical direction of the lighting device in use.

3. The lighting device according to claim 1, further comprising
a partition plate which at least one of prevents the light emitted by the first light source from reaching the second portion and prevents the light emitted by the second light source from reaching the first portion.

4. The lighting device according to claim 1, further comprising
a time division controller which alternates a first state where only the first light source among the first light source and the second light source emits the light and a second state where only the second light source among the first light source and the second light source emits the light, by controlling the first light source and the second light source.

5. The lighting device according to claim 1,
wherein an outer surface of the panel has at least one of text and a graphic to be viewed by a person.

6. A visible light communication system comprising:
the lighting device according to claim 1; and
a terminal which obtains information from the lighting device through visible light communication,
the terminal including:
an image capturer which generates an image in which the lighting device is a subject by imaging the lighting device through reception of the light emitted by the first light source and the light emitted by the second light source;
a signal obtainer which obtains the first information and the second information, based on the image generated by the image capturer;
a calculator which calculates a position of the terminal, based on a positional relationship between a position where the light from the first light source has been received and a position where the light from the second light source has been received in the image generated by the image capturer; and
a presenter which presents information indicating the position of the terminal calculated by the calculator.

7. The visible light communication system according to claim 6,
wherein the calculator prestores a shape of the lighting device, and further compares the prestored shape of the lighting device with a shape of the lighting device in the image, to calculate the position of the terminal and an orientation of the terminal, and the presenter presents information indicating the orientation calculated by the calculator, in addition to the information indicating the position of the terminal.

* * * * *